Figure 1:
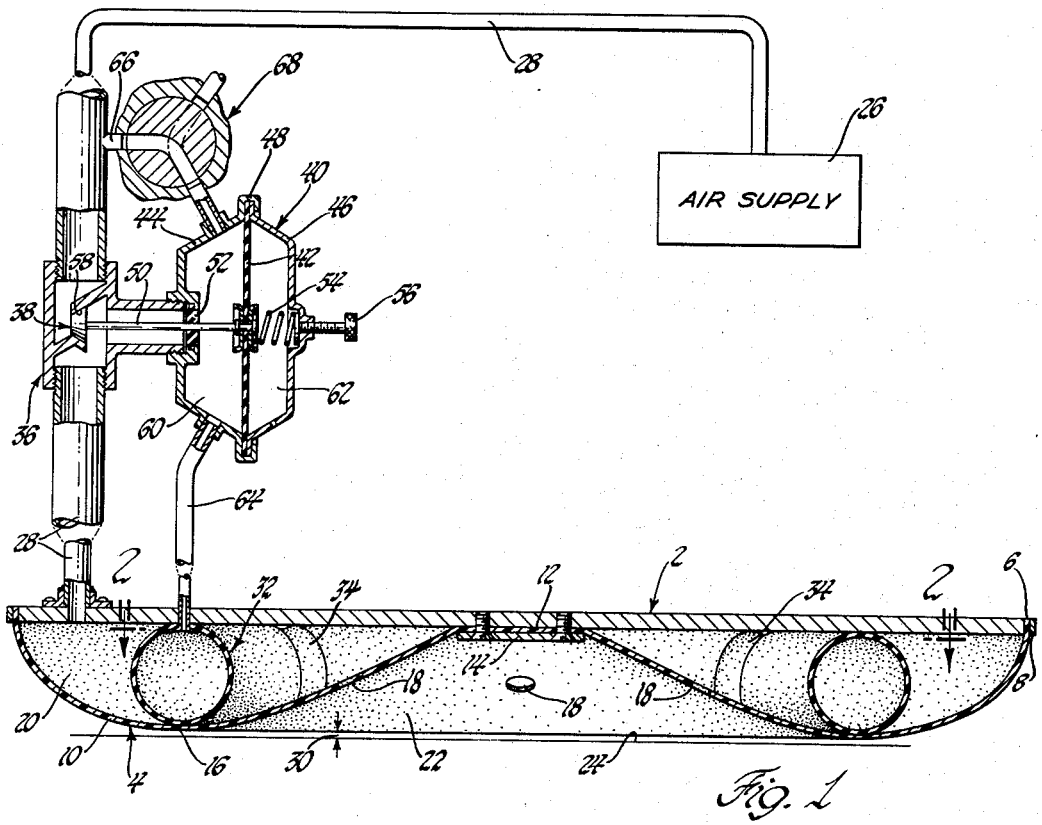

April 12, 1966    H. A. MACKIE    3,245,487
AIR BEARING SUPPORT WITH AUTOMATIC AIR FLOW REGULATION
Filed Nov. 21, 1963

INVENTOR.
Harry A. Mackie
BY
W. F. Wagner
ATTORNEY

United States Patent Office 3,245,487
Patented Apr. 12, 1966

3,245,487
AIR BEARING SUPPORT WITH AUTOMATIC
AIR FLOW REGULATION
Harry A. Mackie, Birmingham, Mich., assignor to General Motors Corporation, Detroit, Mich., a corporation of Delaware
Filed Nov. 21, 1963, Ser. No. 325,385
7 Claims. (Cl. 180—7)

This invention relates generally to flexible plenum chamber type low pressure air bearing support devices and more particularly to such devices incorporating means for automatically regulating the flow of air thereto responsive to either quantitative change in load or change in load distribution relative to the center of gravity of the device.

In copending application Serial No. 306,915, Benjamin N. Snyder et al., entitled "Self-Adjusting Air Bearing Assembly," assigned to General Motors Corporation, a low pressure air bearing support of the general type described is provided with a flow regulating valve operated by a depending gravity urged probe which senses variation in altitude of the load carrying platform portion of the device so that increase or decrease in load induces correlated movement of the valve so that air flow varies as a function of load variation. However, since the probes are displaced radially from the center of the device, they are sensitive only to parallel deflection of the load carrying surface, or angular deflection thereof in a vertical plane containing the probe. Accordingly, effective utilization of such a device is realized only in structures embodying a plurality of supports with the individual probes oriented in plan view so that any direction of angular inclination is at least partially sensed by at least one of the probes. However, it will be obvious that in a single load supporting device, tilting or inclination may occur omnidirectionally and hence the probe operated flow control means will in many instances be ineffective.

The present invention involves utilization of an omnidirectional inclination sensitive device which enables inclination and load sensitive pressure regulation in a single air bearing unit of the type referred to.

According to the general features of the invention, a low pressure air bearing embodying a load supporting platform having a single convolution flexible diaphragm disposed thereunder and secured centrally and peripherally thereto is connected to an air conducting conduit through which air is introduced into the annular chamber formed between the platform and diaphragm. Openings formed in the diaphragm permit air from the annular chamber to enter a plenum cavity formed between the diaphragm and the ground and establish a superatmospheric air cushion which maintains the structure in substantially frictionless spaced relation from the ground. Disposed within the annular chamber is an inflated closed flexible tubular element of circular cross section which when deformed as a result of either increase in load on the platform or inclination thereof causes an increase in the pressure of air contained therein. Such increase in pressure is communicated through a suitable conduit to a fluid pressure sensitive motor which is connected in operative relationship with a flow control valve in the air conducting conduit previously mentioned. As a result, the flow control valve modulates the flow of air into the annular chamber in accordance with either variation in load or shift of a fixed load relative to the center of gravity of the platform.

An object of the present invention is to provide an improved air bearing loaded supporting device.

A further object is to provide a low pressure air bearing device including means for sensing both variation in load and shift of load from the center of gravity thereof.

Another object is to provide a device of the stated character including means responsive to said sensing means for varying the flow of air to said bearing to compensate for such variations.

A still further object is to provide a structure of the stated character including means for initially inflating the tubular sensing means to a predetermined pressure and thereafter maintaining said pressure in a captive state.

Figure 2:
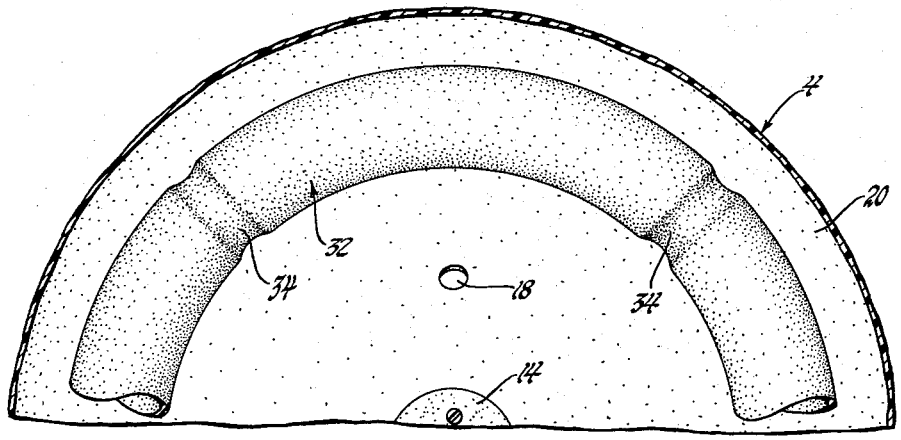

These and other objects, advantages and features of the invention will become more fully apparent as reference is had to the accompanying specification and drawing wherein:

FIGURE 1 is a side elevational view, partly in section and with parts broken away, illustrating a load supporting device in accordance with the invention, and FIGURE 2 is a fragmentary view looking in the direction of arrows 2—2 of FIGURE 1.

Referring now to the drawing and particularly FIGURE 1, there is shown a flexible plenum chamber type air bearing device wherein the reference numeral 2 designates a rigid load supporting platform which in the illustrated embodiment is circular in plan form. Disposed beneath platform 2 is a flexible diaphragm 4, the periphery 6 of which is connected in sealed relation with the perimeter of platform 2 by an encircling band 8. Diaphragm 4 is shaped to provide a circular single depending convolution 10 when the central portion 12 thereof is secured on the lower surface of platform 2 by clamping plate 14. Substantially midway between central portion 12 and the lowermost level 16 of convolution 10, diaphragm 4 is provided with a plurality of apertures 18 which establish communication between the annular chamber 20 formed between platform 2 and diaphragm 4 and the generally conical plenum cavity 22 formed between diaphragm 4 and the ground surface 24. When air is introduced from air supply 26 through conduit 28, chamber 20 is caused to inflate and elevate platform 2 to a predetermined level above the ground 24. Continuing flow of air into chamber 20 emerges through apertures 18 into plenum cavity 22 and establishes a superatmospheric cushion of air which functions to sustain the entire device in frictionless relation to the ground. After establishment of the frictionless support, the required rate of flow of air into chamber 20 is determined by the rate of discharge of air from cavity 22 through the annular throttling gap or circular choke 30 formed between the ground 24 and the lowermost level 16 of diaphragm 4. Naturally, optimum efficiency of the device occurs when the flow of air into chamber 20 in relation to the loss of air through the throttling gap 30 is such that the sustained pressure of air within the plenum cavity is just sufficient to maintain the device and load thereon in frictionless relation to the ground. This relationship, of course, varies with the load. Heretofore, adjustment of air flow has generally been determined by observation or by gradually reducing the input air until the diaphragm "grounds out" and then slightly increasing the rate of flow to restore frictionless relation with the ground. Naturally, either method of control requires periodic readjustment to compensate for changes in load. Similarly, the device disclosed in the Snyder application, while automatically accomplishing the required adjustment in flow rate for evenly distributed loads, is incapable of sensing shift in load distribution except shifts in the same direction from the center of gravity as the probe sensor utilized therein.

In order to sense both parallel and omnidirectional angular platform displacement in accordance with the present invention the chamber 20 has disposed therein an annular flexible tubular member 32 of circular cross section which is provided at circumferential intervals with necked-in portions 34, the purpose of which will shortly be described. Tubular member 32 is arranged concentrically relative to the chamber 20 and is preferably vertically registered with the imaginary circle defined by the throttling gap 30. Tubular member 32 is adapted to be inflated to a selected pressure, in a manner shortly to be described, so that the diameter thereof bridges the vertical space between the lower surface of platform 2 and the upper surface of diaphragm 4 adjacent throttling gap 30 when the diaphragm is inflated to its optimum configuration. It will thus be seen that under normal operating conditions, tube 32 will maintain a circular cross section throughout its circumference whenever the platform 2 occupies a predetermined level above ground 24, but will be compressed or distorted into an elliptical cross section either upon lowering of platform 2 due to increased load or upon inclination of the platform occasioned by significant maldistribution of the load in any direction from the center of gravity of the load supporting platform.

In order to utilize pressure variation resulting from such distortion of tubular member 32 in accordance with the invention, conduit 28 has disposed therein a fitting 36 which includes a plunger valve 38 which is recriprocably operable to vary the rate of flow from supply 26 to chamber 20. Threadably coupled to fitting 36 is a fluid pressure responsive device 40 comprising a closed cylindrical housing, the interior of which is partitioned by a flexible diaphragm 42. In the illustrated embodiment, the closed cylindrical housing is formed of two cup-shaped members 44 and 46 having abutting flanges which are crimped together in overlapping relation with the periphery 48 of diaphragm 42. The stem portion 50 of valve 38 extends through a sliding seal 52 formed in member 44 and is attached centrally to diaphragm 42 in a conventional manner. A coil spring 54 extends between the center of diaphragm 42 and an adjustable element 56 threadably mounted in member 46. It will, of course, be apparent that if properly adjusted, the compression force exerted by spring 54 will urge valve 38 against the valve seat 58 in fitting 36 and thereby completely arrest flow of air from supply 26 to chamber 20. However, when a pressure differential is induced between the chamber 60 formed at the left side of diaphragm 42 and the atmosphere vented chamber 62 formed at the opposite side thereof, the diaphragm will be displaced toward the right and permit a rate of flow of air through conduit 28 into chamber 20. The degree of displacement of valve 38 is dependent upon the amount of rising pressure in chamber 60 in relation to the constant bias exerted by spring 54. In the illustrated embodiment, tubular member 32 is connected to chamber 60 by a conduit 64 so that pressure in the chamber varies directly with pressure changes in tubular member resulting from distortion.

Initial inflation of tubular member 32 and establishment of the aforementioned pressure differential between chambers 60 and 62 is accomplished by means of a bypass passage 66 extending between member 44 and a portion of conduit 28 between supply 26 and valve 38. Disposed in bypass passage 66 is a rotary valve 68 which is manually settable to a first position enabling flow of air into chamber 60 and through conduit 64 into tubular member 32. Thus, when in the position shown in solid lines, valve 68 enables inflation of tubular member 32 to a predetermined pressure which is then rendered captive by repositioning the valve 68 to a blocking position intermediate the position shown in solid and dotted lines, respectively. Thereafter, the captive pressure within tubular member 32 is identical to that contained within chamber 60. Hence, the pressure within chamber 60 initially serves to actuate valve 38 a predetermined amount by displacing diaphragm 42 against spring 54 and subsequently varies the displacement of the valve according to the degree of distortion of tubular member 32 from its normal circular cross section. Therefore, after initially establishing a rate of air flow into chamber 20 by manually adjusting screw 56, any increase in flow necessary to sustain either additional load on the platform or maldistribution of a uniform load is automatically accomplished. The position of valve 68 shown in dotted lines enables venting of chamber 60 and the interior of tubular member 32 either to allow total collapse of the support whenever the device is not in use or to reduce the level of captive pressure when significantly reduced loads are to be carried on the device.

Although it is intended that the device be adjusted under operating conditions so that a minute space exists between the portions of tubular member 32 tangent to the platform and diaphragm, in order to prevent any possibility of blocking communication between conduit 28 and apertures 18, the tubular member 32 is necked in at circumferential intervals as previously described. Hence, even under momentary conditions of severely increased load, the tubular member is prevented from totally partitioning the chamber 20.

It is particularly important to note that in the present invention the load sensing tubular member 32 which ultimately actuates valve 38 is totally free of any directional insensitivity and is therefore particularly useful in applications employing a single load supporting device in which load changes may induce visually undetectable inclination of the load supporting surface.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a ground proximate air bearing device including a load supporting surface having flexible means disposed thereunder forming a depending inflatable annular chamber surrounding and communicating with a ground proximate plenum cavity, conduit means for conducting air into said chamber, variable flow control means in said conduit, and fluid pressure sensitive flow control operating means disposed within said chamber operative responsive to variation in displacement of said supporting surface relative to the ground, said last mentioned means comprising a closed pressurized deformable hollow body of normally circular cross section.

2. The structure set forth in claim 1 wherein said hollow body is annular in form and extends around the entire circumference of said annular chamber.

3. The structure set forth in claim 2 wherein said annular body is provided with circumferentially spaced necked-in portions.

4. In a ground proximate air bearing device including a load supporting surface having a flexible member disposed thereunder forming a depending annular chamber surrounding and communicating with a ground proximate plenum cavity, conduit means for conducting air into said annular chamber, variable flow control valve means disposed in said conduit means, motor means for actuating said valve means, and fluid pressure sensitive means disposed within said chamber for operating said motor means responsive to variation in displacement of said platform relative to the ground, said last mentioned means comprising a closed deformable annular hollow body disposed concentrically within said annular chamber.

5. In a ground proximate air bearing device including a rigid support structure having a flexible annulus disposed thereunder forming an inflatable annular chamber surrounding and communicating with a ground proximate plenum cavity, conduit means communicating with said chamber, valve means for variably regulating air flow through said conduit means, fluid pressure sensitive actuating means connected to said valve means, an inflated annular closed hollow body disposed within said chamber connected in fluid communicating relation with said actuating means, said body being deformable responsive to variation in displacement of said support structure relative to the ground to produce pressure variation acting on said actuating means.

6. In a ground proximate air bearing device including a rigid support structure having a flexible annulus disposed thereunder and secured centrally and peripherally thereto so as to form an inflatable chamber defining and surrounding a ground proximate plenum cavity, means providing open communication between said chamber and cavity, conduit means communicating with said chamber, valve means for regulating air flow through said conduit means to said chamber, fluid pressure sensitive actuating means connected to said valve means, a closed hollow body disposed within said chamber deformable responsive to variation in displacement of said support structure relative to the ground, means connecting said hollow body in fluid communicating relation with said actuating means, and manually operable means for selectively connecting said hollow body in communicating relation with said conduit upstream of said valve means to inflate said body to a predetermined pressure, rendering the pressure therein captive, and venting said cavity to atmosphere.

7. In a ground proximate air bearing device including a load supporting surface having a single convolution flexible member secured centrally and peripherally thereunder forming a depending annular chamber surrounding and communicating with a ground proximate plenum cavity, conduit means for conducting air into said annular chamber, flow control valve means disposed in said conduit means, motor means for actuating said valve means, fluid pressure sensitive means disposed within said chamber for operating said motor means responsive to variation in displacement of said platform relative to the ground, said fluid pressure sensitive means comprising an inflated annular hollow body extending around the entire circumference of said annular chamber adjacent the lowermost extremity thereof, and means for establishing and retaining a predetermined fluid pressure in said hollow body.

References Cited by the Examiner
UNITED STATES PATENTS 3,081,886  3/1963  Flexman et al. _____ 180—7

FOREIGN PATENTS 1,278,912  11/1961  France.

BENJAMIN HERSH, *Primary Examiner.*